US012073748B2

(12) United States Patent
Gunneras et al.

(10) Patent No.: US 12,073,748 B2
(45) Date of Patent: Aug. 27, 2024

(54) MECHANICAL NON-BINARY BRIXEL AND BRIXEL DISPLAY

(71) Applicant: BREAKFAST, LLC, Brooklyn, NY (US)

(72) Inventors: Mattias Gunneras, Brooklyn, NY (US); Andrew Zolty, Brooklyn, NY (US); Mick Maloney, Brooklyn, NY (US); Andrew Laska, Brooklyn, NY (US)

(73) Assignee: BREAKFAST, LLC, Brooklyn, NY (US)

( * ) Notice: Subject to any disclaimer, the term of this patent is extended or adjusted under 35 U.S.C. 154(b) by 0 days.

(21) Appl. No.: 18/143,036

(22) Filed: May 3, 2023

(65) Prior Publication Data

US 2023/0360565 A1 Nov. 9, 2023

Related U.S. Application Data

(63) Continuation of application No. 17/868,748, filed on Jul. 19, 2022, now Pat. No. 11,688,309, which is a continuation of application No. 17/067,117, filed on Oct. 9, 2020, now Pat. No. 11,443,662.

(60) Provisional application No. 62/913,084, filed on Oct. 9, 2019.

(51) Int. Cl.
*G09F 9/30* (2006.01)
*G09F 9/302* (2006.01)

(52) U.S. Cl.
CPC ............ *G09F 9/302* (2013.01); *G09F 9/3026* (2013.01)

(58) Field of Classification Search
CPC ............................... G09F 11/02; G09F 11/025
See application file for complete search history.

(56) References Cited

U.S. PATENT DOCUMENTS

| | | | | |
|---|---|---|---|---|
| 760,242 A * | 5/1904 | Perry | G09F 11/02 | 40/468 |
| 2,181,104 A * | 11/1939 | Moorhouse | G09F 11/025 | 40/526 |
| 2,360,780 A * | 10/1944 | McCarty | G09F 11/025 | 40/470 |
| 5,562,459 A * | 10/1996 | Durlach | G09F 11/025 | 345/110 |
| 2003/0029065 A1* | 2/2003 | Haghighi | G09F 11/025 | 40/493 |

(Continued)

*Primary Examiner* — Gary C Hoge
(74) *Attorney, Agent, or Firm* — Run8 Patent Group, LLC; Peter Miller

(57) ABSTRACT

One variation of system includes a set of a brixel units and a primary controller configured to distribute a set of actuation routines to the set of brixel units, each brixel unit including: a chassis including a motor mount and a arm extending outwardly from the motor mount and defining a drive post mount opposite the motor mount; a motor coupled to the motor mount; a drive post arranged on the drive post mount and driven by the motor; a pixel element mounted to and configured to rotate with the drive post and including a first face defining a first visual characteristic and a second face defining a second visual characteristic; and a local controller configured to store an actuation routine and to drive the motor to locate the pixel element over a sequence of angular positions, relative to the arm, defined by the actuation routine.

20 Claims, 7 Drawing Sheets

(56) References Cited

U.S. PATENT DOCUMENTS

| | | | | | |
|---|---|---|---|---|---|
| 2006/0260159 | A1* | 11/2006 | Ajumobi | G09F 11/025 | 40/513 |
| 2007/0199216 | A1* | 8/2007 | Atkinson | G09F 11/025 | 40/503 |
| 2013/0194162 | A1* | 8/2013 | Autenzeller | G09F 11/025 | 345/1.3 |

* cited by examiner

MECHANICAL NON-BINARY BRIXEL AND BRIXEL DISPLAY

CROSS-REFERENCE TO RELATED APPLICATIONS

This Application claims the benefit of U.S. Provisional Application No. 62/913,084, filed on 9 Oct. 2019, which is incorporated in its entirety by this reference.

This Application is related to U.S. patent application Ser. No. 15/824,244, filed on 28 Nov. 2017, which is incorporated in its entirety by this reference.

TECHNICAL FIELD

This invention relates generally to mechanical displays and more specifically to a new and unique mechanical non-binary brixel and brixel display in the field of mechanical displays.

DESCRIPTION OF THE EMBODIMENTS

Figure 1:
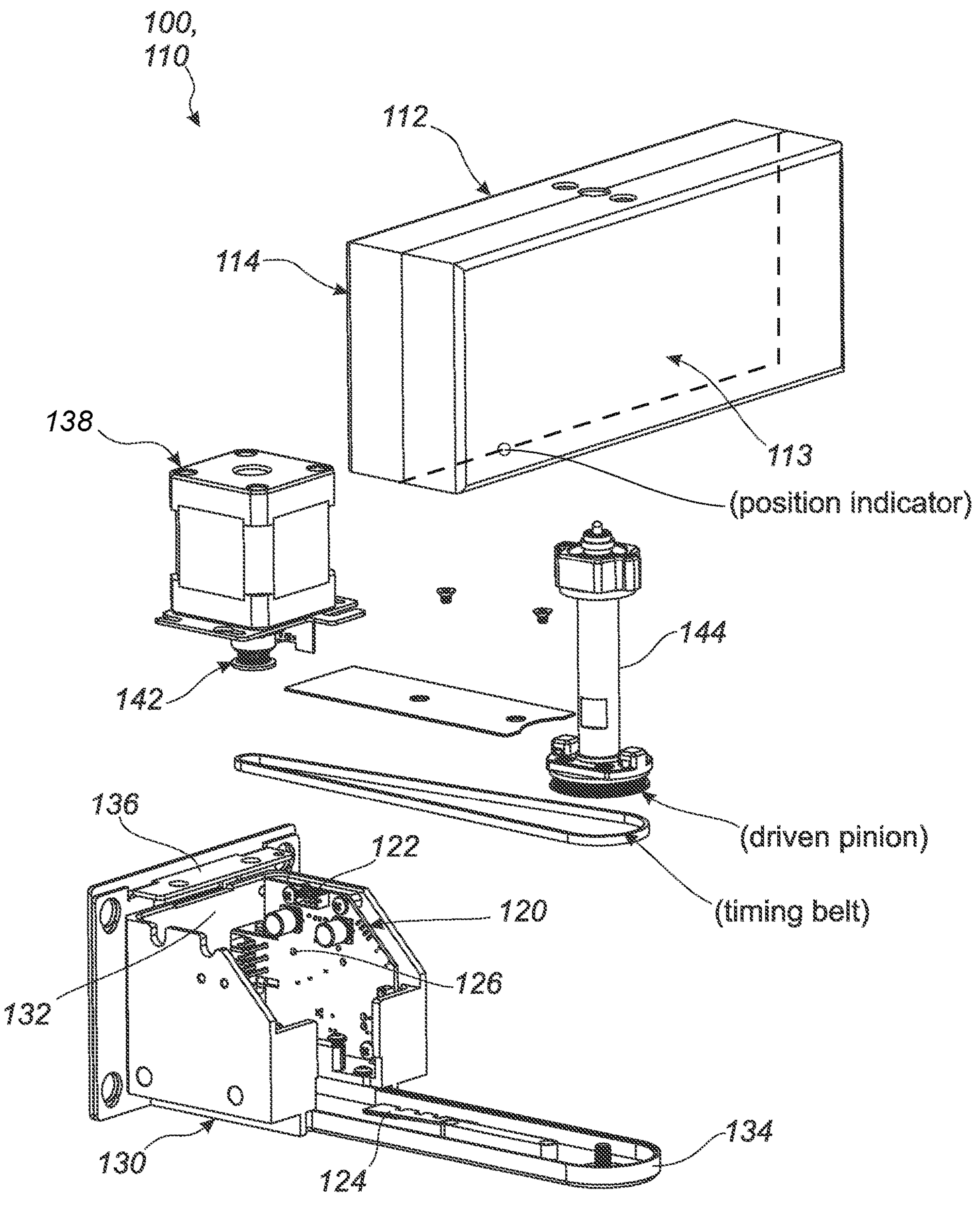
FIG. 1 is a schematic representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Brixel Unit

As shown in FIGS. 1-4, a brixel unit 110 includes: a chassis 130; a motor 138; a drive pinion 142; a drive post 144; a pixel element 112; a home sensor; and a local controller 120. The chassis 130: defines a motor mount 132; includes a arm 134 extending outwardly from the motor mount 132 and defining a drive post mount opposite the motor mount 132; includes a mounting latch 136 adjacent the motor mount 132 and opposite the drive post mount and configured to transiently engage and support the chassis 130 on a mounting bracket 170 installed on a display surface; and includes alignment features adjacent the mounting latch 136 and configured to align the chassis 130 to corresponding features on the mounting bracket 170. The motor 138 is arranged in the motor mount 132. The drive pinion 142 is coupled to an output shaft of the motor 138. The drive post

144 is pivotably coupled to the drive post mount and includes a driven pinion coupled to the drive pinion 142. The pixel element 112: is mounted to and configured to rotate with the drive post 144; and includes a first face 113 defining a first visual characteristic, a second face 114 opposite the first face 113 and defining a second visual characteristic, and a position indicator offset from the drive post 144. The home sensor is coupled to the chassis 130 and is configured to output a signal representing an absolute position of the pixel element 112 relative to the chassis 130 responsive to proximity of the position indicator. The local controller 120: includes local memory configured to store an actuation routine; and is configured to drive the motor 138 according to target angular positions represented the actuation routine.

In one variation, each brixel unit 110 in the set of brixel units 110 includes: a chassis 130 that includes a motor mount 132, a arm 134 extending outwardly from the motor mount 132 and defining a drive post mount opposite the motor mount 132, and a mounting latch 136 adjacent the motor mount 132, opposite the drive post mount, and configured to transiently engage and support the chassis 130 on a mounting bracket 170 installed on a display surface; a motor 138 coupled to the motor mount 132; a drive pinion 142 coupled to an output shaft of the motor 138; a drive post 144 pivotably coupled to the drive post mount and including a driven pinion coupled to the drive pinion 142; a pixel element 112 mounted to and configured to rotate with the drive post 144 including a first face 113 defining a first visual characteristic and a second face 114 opposite the first face 113 and defining a second visual characteristic; and a local controller 120 configured to store an actuation routine in local memory at the brixel unit 110 and configured to drive the motor 138 to locate the pixel element 112 over a sequence of angular positions, relative to the arm 134, defined by the actuation routine.

2. System

A system 100 can thus include: a set of brixel units 110 arranged in an array; and a primary controller 160 configured to distribute a set of actuation routines to the set of brixel units 110.

In one variation, the system 100 can includes: a primary controller 160; a first set of brixel units 110 arranged in a first column (or a first row) and mounted to a display surface; a first column controller 150 coupled to the first set of brixel units 110 and configured to serve a first set of actuation routines, received from the primary controller 160, to local controllers 120 in the first set of brixel units 110; a second set of brixel units 110 arranged in a second column (or a second row) adjacent the first column and mounted to the display surface; and a second column controller 150 coupled to the second set of brixel units 110 and configured to serve a second set of actuation routines, received from the primary controller 160, to local controllers 120 in the second set of brixel units 110.

3. Applications

Generally, a brixel unit 110 represents an independently-operable, non-binary mechanical "pixel" configured to store a sequence of non-binary values representing a range of pixel positions and configured to autonomously manipulate a physical pixel element 112 according to this sequence of values. In particular, the brixel unit 110 can include: a pixel element 112 defining two (or more) faces spaced radially about a rotational axis; a motor 138 configured to rotate the pixel element 112 about this rotational axis; and a local controller 120 configured to drive the motor 138—and thus the pixel element 112—over a range of angular positions based on a set of values contained in an actuation routine upload and stored in local memory on the brixel unit 110.

Figure 7:
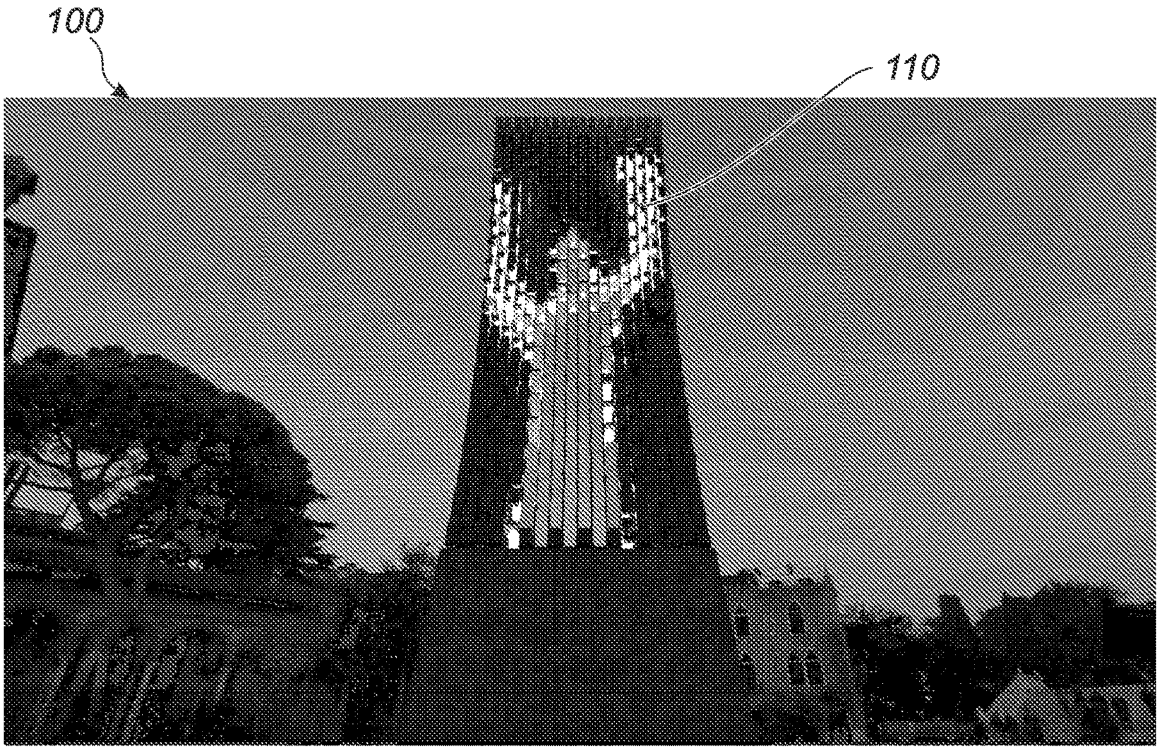
FIG. 7 is a schematic representation of one variation of the system.
Figure 7:
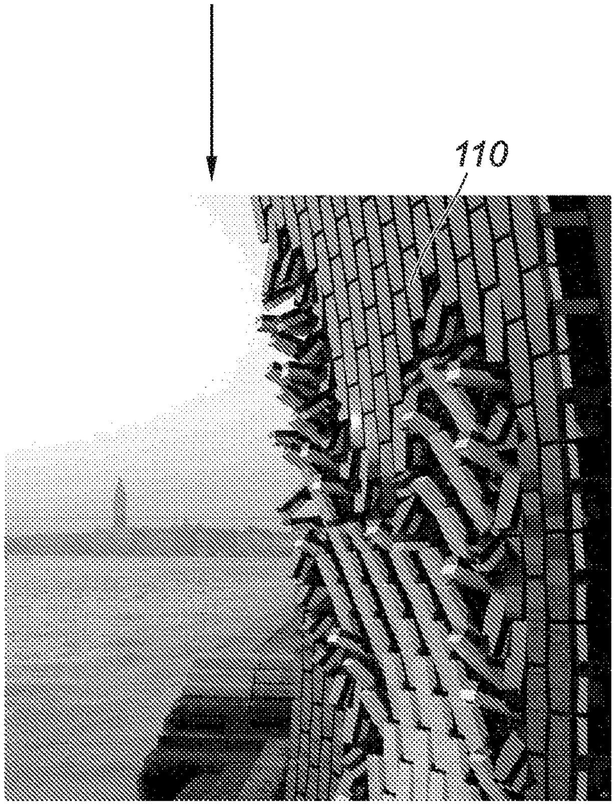

Furthermore, an array of brixel units 110 can be installed on a vertical surface (shown in FIGS. 2 and 7), a horizontal surface (shown in FIG. 3), or a non-planar surface (shown in FIG. 4) to form a non-binary, multi-pixel display. Brixel units 110 in this system 100 (hereinafter an "installation") can be grouped into columns, rows, or clusters, each controlled by a column controller 150; and each column controller 150 can be connected to and controlled by a primary controller 160.

In particular, though the pixel element 112 defines two (or more) faces of different colors and/or textures (e.g., black and white, glossy or polished matte), the brixel unit 110 can drive and hold the pixel element 112 over a range of angular positions between two binary 0° (e.g., depicting the first face 113 of the pixel element 112 facing outwardly parallel to a display surface) and 180° (e.g., depicting the second face 114 of the pixel element 112 facing outwardly parallel to the display surface) positions. Brixel units no installed on a display surface can thus independently and autonomously execute (unique or semi-unique) actuation routines—received from the master and corresponding column controllers 150—to form an animated mechanical display that represents non-binary pixel values (e.g., grayscale values from "0" to "255") in images by locating corresponding pixel elements 112 in brixel units 110 in the installation over a range of angular positions (e.g., between a 0° and 180° in 0.7° increments).

4. Chassis and Drive Post

As shown in FIG. 1, the chassis 130 can include a folded sheet metal structure defining a motor mount 132 and including a arm 134 cantilevered outwardly from the motor mount 132. The drive post 144 can include: a rotary and thrust bearing assembly mounted to a distal end of the arm 134; a driveshaft installed in the rotary and thrust bearing assembly and extending upwardly from the arm 134; and a driven pinion (e.g., a driven pulley) mounted to the driveshaft.

However, the chassis 130 and the drive post 144 can define any structure or geometry.

5. Pixel Element

Generally, a pixel element 112 in a brixel unit 110 is mounted to the drive post 144, is configured to rotate with the drive post 144, and defines two opposing, outwardly-facing faces exhibiting different colors, patterns, and/or textures.

In one implementation, a pixel element 112 includes two clamshell structures assemblable into a cuboid shell defining two planar, opposing faces of different colors and textures. For example, the pixel element 112 can define a two-inch-tall, two-inch-deep, eight-inch-wide cuboid, wherein a first large face of the cuboid—parallel to a rotational axis of the pixel element 112—is coated with a matte black coating, and wherein a second, opposing face of the cuboid is a mirror-polished metallic surface. In another example, the pixel element 112 defines a one-inch-tall, two-inch-deep, twenty-inch-wide cuboid, wherein a first large face of the cuboid is painted glossy white, and wherein the opposing large face of the cuboid is a matte black.

Thus, a pixel element 112 of a brixel unit 110 can include: a first face 113 defining a first light reflectivity; and a second face 114 defining a second light reflectivity less than the first light reflectivity. Additionally or alternatively, a pixel element 112 of a brixel unit 110 can include: a first face 113 defining a first optical transparency; and a second face 114 defining a second optical transparency less than the first optical transparency.

Furthermore, a brixel unit 110 can include a light element 122 (e.g., an LED) arranged behind the pixel element 112, such as mounted to the chassis 130 or installed on a PCB (e.g., with the local controller 120 and a motor driver) arranged between the chassis 130 of the brixel unit 110 and the pixel element 112. Thus, the light element 122 can back-light the pixel element 112, and the opposing faces of the light element 122 can reflect or pass light emitted by the light element 122 in different magnitudes.

In a similar implementation, the drive post 144 includes a hollow axle or defines a light tube, and the brixel unit 110 includes a light element 122 arranged in the arm 134 and configured to illuminate the bore or light tube through the drive post 144, thereby illuminating the interior volume of the pixel element 112. In this implementation, one or more sides of the pixel element 112 can include a perforating, translucent, or transparent face configured to pass light output by the light element 122 and transmitted through the drive post 144.

However, the pixel element 112 can define any other form, color, pattern, or texture.

6. Drive System

The motor 138 in a brixel unit 110 can include a stepper motor 138, a servo motor 138, or a brushed or brushless DC motor 138 installed in the motor mount 132 of the chassis 130. For example, the motor 138 can be installed in the motor mount 132 with an output shaft of the motor 138 facing downward and extending through the bottom of the motor mount 132, and a drive pinion 142 (e.g., a drive pulley) can be mounted to the output shaft of the motor 138.

In one implementation, the drive pinion 142 is coupled to the driven pinion on the drive post 144 via a timing belt, and a spring-loaded belt tensioner is mounted to the arm 134 and configured to maintain tension on the timing belt. Alternatively, the drive pinion 142 can be coupled to the driven pinion via a driveshaft or other power transmission.

The brixel unit 110 can also include a rotary encoder coupled to the motor 138, such as a rotary optical encoder configured to output "ticks" responsive to angular position changes of the output shaft of the motor 138. (Alternatively, the rotary encoder can be coupled to the drive post 144 and can output "ticks" responsive to angular position changes of the pixel element 112.)

7. Home Sensor

A position indicator of a brixel unit 110 is mounted to the pixel element 112, and the home sensor is mounted to the chassis 130 (e.g., to the arm 134) and outputs a signal representative of proximity to the position indicator, which the local controller 120 can then monitor to calibrate and maintain a "home" (or "0°") position of the pixel element 112 during operation.

For example, the home sensor can include a Hall effect sensor arranged on the arm 134 between the motor 138 and the drive post 144; and the position indicator can include a magnetic element integrated into or mounted to a bottom face of the pixel element 112 and configured to trigger the Hall effect sensor once per rotation of the pixel element 112 at a repeatable angular position of the pixel element 112 relative to the chassis 130. In another example, the home sensor includes a limit switch mounted to the chassis 130, such as on the arm 134 near the motor mount 132; and the position indicator includes a cam or other mechanical feature mounted to or integrated into the pixel element 112 and configured to contact the limit switch once per rotation of the pixel element 112 at a repeatable angular position of the pixel element 112. Thus, in these examples, the local controller 120 can detect and verify an absolute position of the pixel element 112 relative to the home sensor for instances in which rotation of the pixel element 112 moves the position indicator within proximity of the home sensor sufficient to change an output of the home sensor.

However, the home sensor and the position indicator can include any other sensor or indicator type and can cooperate in any other way to indicate an absolute position of the pixel element 112.

8. Local Controller

The local controller 120 of a brixel unit 110 is mounted to the chassis 130, such as proximal the motor 138, and includes an internal clock and local memory. As described below, the local controller 120 caches or stores an actuation routine and implements open-loop or closed-loop controls to drive the motor 138 through a sequence of steps and/or rotary encoder ticks corresponding to target changes in angular position of the pixel element 112 specified in or interpreted from the actuation routine.

9. Column Controller and Primary Controller

A column (or row, a cluster) of brixel units 110 in an installation can be connected—in parallel or in series—to a column controller 150, and each column controller 150 in the installation can be connected—in parallel or in series—to a primary controller 160, such as described in U.S. patent application Ser. No. 15/824,244, which is incorporated in its entirety by this reference.

In particular, a column controller 150: can be located between a column or other cluster of brixel units 110, the primary controller 160, and a power supply; can distribute power to this column or cluster of brixel units 110; can receive actuation routines and actuation triggers from the primary controller 160; and can distribute these actuation routines and actuation triggers to corresponding brixel units 110 in this column or cluster. In one example, each brixel unit 110 in a column of brixel units 110 is connected to a numbered port on the column controller 150 based on a position of this brixel unit no in the column. In this example, a column controller 150 receives a set of actuation routines—each labeled with a port number based on a vertical position of a pixel represented by the actuation routine—from the primary controller 160 and outputs each actuation routine to a corresponding port number; each brixel unit 110 thus stores a local copy of its received actuation routine and executes this actuation routine upon receipt of a trigger from the primary controller 160 and/or from the column controller 150.

In another example, brixel units 110 in a column (or cluster) of brixel units no are connected in series—or "daisy-chained" together—with a first brixel unit 110 in the column or cluster connected to (or forming) the column controller 150. In this example, the column controller 150 (or the first brixel unit 110 in the column) receives a set of actuation routines—ordered from the bottom of the column to the top of the column—from the primary controller 160 and distributes the set of actuation routines to the first brixel unit 110 in its column. Upon receipt, the first brixel unit 110 extracts the first actuation routine from this set and passes the remaining, ordered actuation routines to the second brixel unit 110 in the column. The second brixel unit 110 then extracts the first actuation routine in this set and passes the remaining, ordered actuation routines to the next brixel unit 110 in the column. Subsequence brixel units 110 in this column repeat this process up to the top brixel unit 110 in the column in order to complete distribution of actuation routines to brixel units 110 in the column without necessitating unique identification of brixel units 110 in the column.

However, the master, column, and local controllers 120 can implement any other protocol to distribute and store actuation routines in preparation for or during operation.

10. Installation: Vertical Surface

Figure 2:
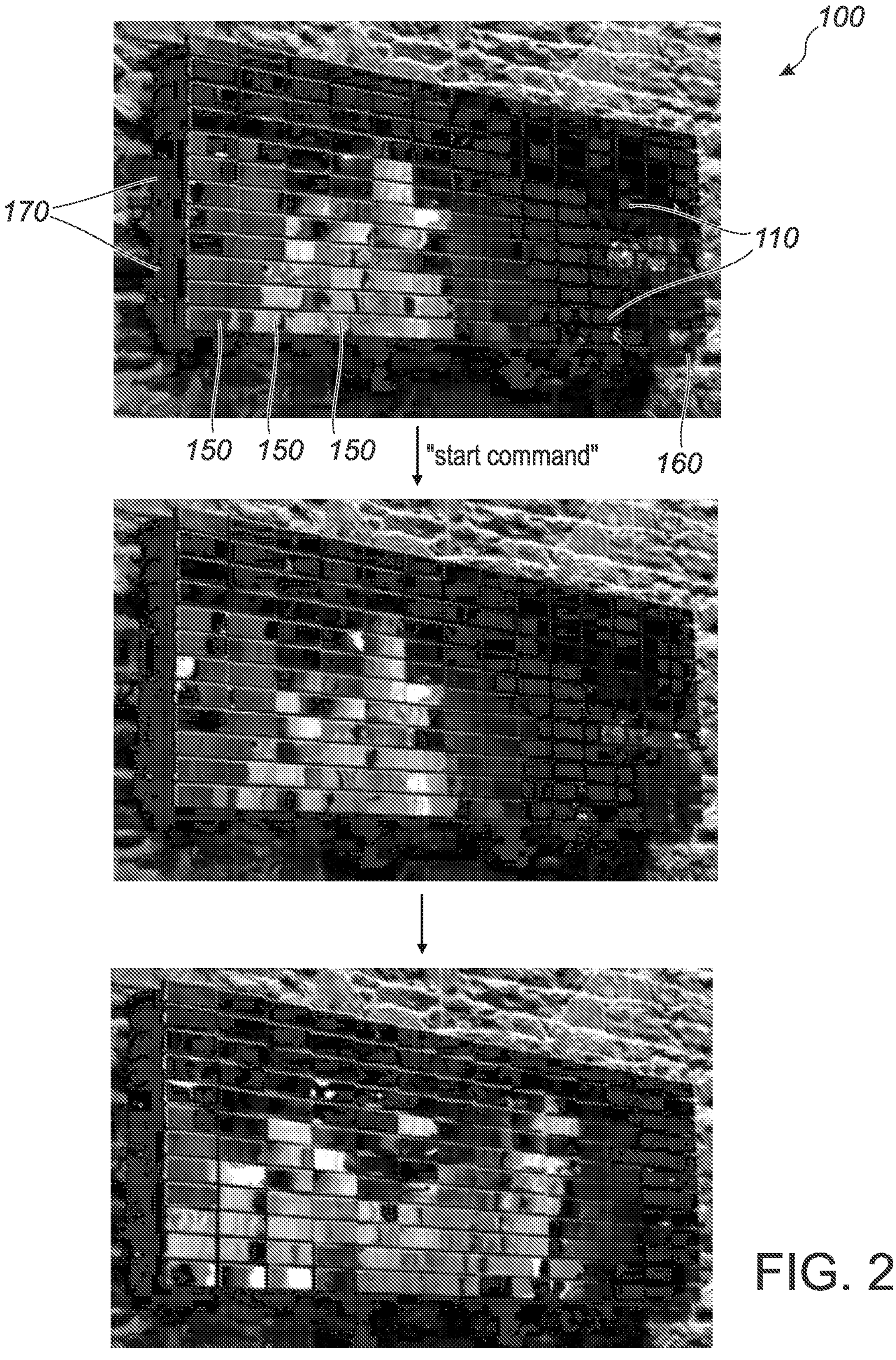
FIG. 2 is a flowchart representation of one variation of the system.

As shown in FIG. 2, an array of brixel units 110 can be installed on a vertical surface.

In one implementation, an array of mounting brackets 170 is installed on (e.g., fastened onto) a vertical surface, such as a planar wall. In this implementation, each mounting bracket 170 can include: a set of (e.g., one or more) alignment features configured to engage and align with corresponding features on a brixel unit 110; a mounting feature configured to transiently engage a mounting latch 136 of the brixel unit 110; and a power and data connector(s) configured to engage a corresponding power and data connector(s) of the brixel unit 110 when the brixel unit 110 is installed on the mounting bracket 170. A column controller 150 is then mounted below or connected to the bottom mounting bracket 170 in each column of mounting brackets 170 in this array. Power and data connector(s) from each column of mounting brackets 170 and the corresponding column controller 150 are connected in series, and these column controllers 150 are connected in parallel or in series to one primary controller 160 installed proximal a bottom-left mounting bracket 170 in the array.

In this implementation, a pixel element 112 of a first brixel unit 110 designated for the installation is manually rotated such that its long axis is substantially parallel to the arm 134 of its chassis 130, thereby enabling a technician to look past the pixel element 112—parallel to the long axis of the produce unit—and thus view the back of the chassis 130 and the mounting latch 136 behind the pixel element 112 in this brixel unit 110. The technician then aligns the alignment features of the chassis 130 with the corresponding features on a mounting bracket 170 and presses the brixel unit 110 toward the mounting bracket 170 until the mounting latch 136 engages a corresponding feature on the mounting bracket 170 to retain the chassis 130 on the mounting bracket 170, thereby mechanically coupling the brixel unit 110 to the mounting bracket 170 and connecting a power and data connector(s) in the mounting bracket 170 to a corresponding port(s) on the brixel unit 110. The technician repeats the process for each other mounting bracket 170 and brixel unit 110 to complete this installation.

Furthermore, in this implementation, to service or replace a brixel unit 110 in this installation at a later time, the technician may manually rotate the pixel element 112 of the brixel unit 110 such that the long axis of the pixel element 112 is substantially parallel to the arm 134 of its chassis 130, thereby enabling a technician to look past the pixel element 112—parallel to this long axis—and thus view the chassis 130 and mounting latch 136 behind the pixel element 112 in this brixel unit 110. The technician may then: insert an elongated tool past the pixel element 112 to engage the mounting latch 136; manipulate the tool to lift, depress, or otherwise retract the mounting latch 136 from the mounting bracket 170; and then pull the brixel unit 110 horizontally off of the mounting bracket 170 to remove the brixel unit 110 from the installation.

However, an array of mounting brackets 170 and brixel units 110 can be installed on a vertical surface and connected in any other way to complete an installation.

10.1 Installation: Horizontal Surface

Figure 3:
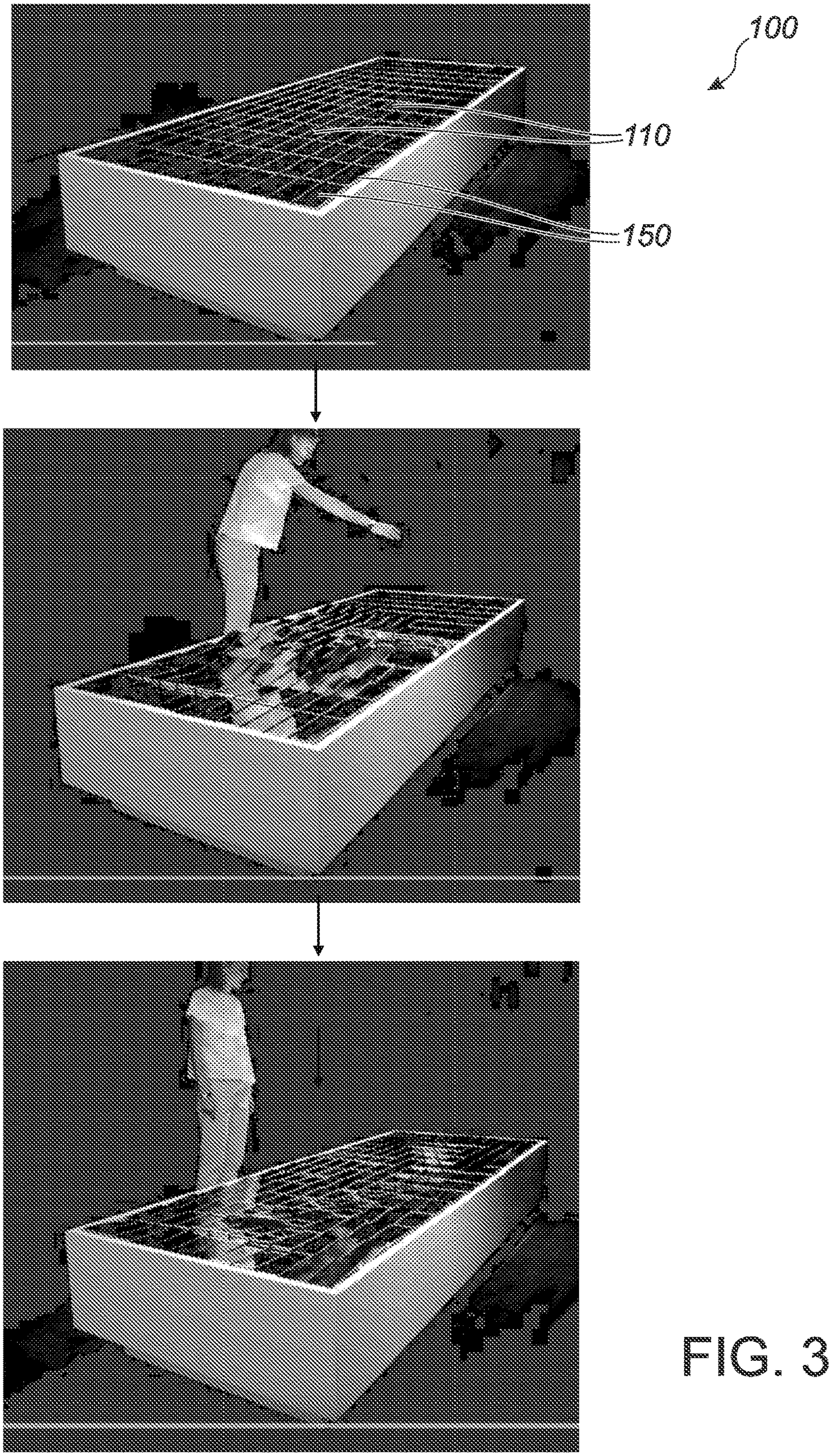
FIG. 3 is a flowchart representation of one variation of the system.

As shown in FIG. 3, a set of brixel units 110 can be similarly installed on a horizontal planar surface, such as a floor or ceiling.

10.2 Installation: Planar Display on Planar Surface

In a similar implementation, the system 100 includes: a first column of mounting brackets 170 configured to mount a first subset of brixel units 110 to a planar display surface (e.g., a planar vertical or horizontal display surface); and a second column of mounting brackets 170 configured to mount a second subset of brixel units 110 to the planar display surface; etc. In this implementation, each mounting bracket 170 includes: a mounting feature configured to transiently engage a mounting latch 136 of a brixel unit no in the set of brixel units 110 and to transiently retain the brixel unit 110 against the display surface with the pixel element 112 cantilevered from the display surface via the arm 134 of the brixel unit 110; and an electrical connector configured to electrically couple to the local controller 120 in the brixel unit 110.

In this implementation, the first column of mounting brackets 170 can include a set of discrete mounting brackets 170 that are mechanically fastened and assembled to form a first mounting bracket 170 assembly configured to mount to the planar display surface. Alternatively, a singular or unitary structure can be fabricated to form the first column of mounting brackets 170. The second column of mounting brackets 170, etc. can be similarly assembled or constructed.

Furthermore, the mounting brackets 170 can define similar (e.g., approximately identical) depths, and the brixel units 110 in the system 100 can include arms 134 of similar length. Thus, the first faces 113 of pixel elements 112 in the first subset of brixel units 110, the second subset of brixel units 110, etc. can cooperate to interpolate a smooth, planar surface—parallel to and offset from the planar display surface—when occupying nominal "home" positions.

In this implementation, the system 100 can further includes a first column (or "group") controller: arranged in the first mounting bracket 170 assembly; serially coupled to local controllers 120 in the first subset of brixel units 110 via electrical connectors arranged in the first column of mounting brackets 170; coupled to the primary controller 160; and configured to receive a first set of actuation routines from the primary controller 160. Thus, a first brixel unit 110 in the first subset of brixel units 110 can: receive the first set of actuation routines from the group controller 150 and pass the first set of actuation routines to a second brixel unit 110 in the first subset of brixel units 110; the second brixel unit 110 in the first subset of brixel units 110 can receive the first set of actuation routines from the first brixel unit 110 and pass the first set of actuation routines to a third brixel unit 110 in the first subset of brixel units 110; etc.

In this implementation, the system 100 can similarly include a second column (or "group") controller: arranged in the second mounting bracket 170 assembly; serially coupled to local controllers 120 in the second subset of brixel units 110 via electrical connectors arranged in the second column of mounting brackets 170; coupled to the primary controller 160; and configured to receive a second set of actuation routines from the primary controller 160 and to distribute these actuation routines to the second subset of brixel units 110.

10.3 Installation: Non-Planar Display on Planar Surface

Conversely, in the foregoing implementation, the mounting brackets 170 can be installed on a planar display surface (e.g., a planar vertical or horizontal display surface), and the brixel units 110 in the system 100 can include arms 134 of dissimilar lengths. For example, in the foregoing implementation: a first arm 134 of a first brixel unit 110 in the first column of brixel units 110 can define a first length; a second arm 134 of a second brixel unit 110 in the first column of brixel units 110 can define a second length greater than the first length; a third arm 134 of a third brixel unit 110 in the second column of brixel units 110 can define a third length greater than the first length; and a fourth arm 134 of a fourth brixel unit 110 in the second column of brixel units 110 can define a fourth length greater than the third length; etc.

Thus, the first faces 113 of pixel elements 112 in brixel units 110 in the first column of brixel units 110, the second subset of brixel units 110, etc. can cooperate to: interpolate a smooth, non-planar (e.g., a three-dimensional) surface when occupying nominal "home" positions; and form a "textured" non-planar surface when offset from their nominal "home" positions.

10.4 Installation: Compound Surface

Figure 4:
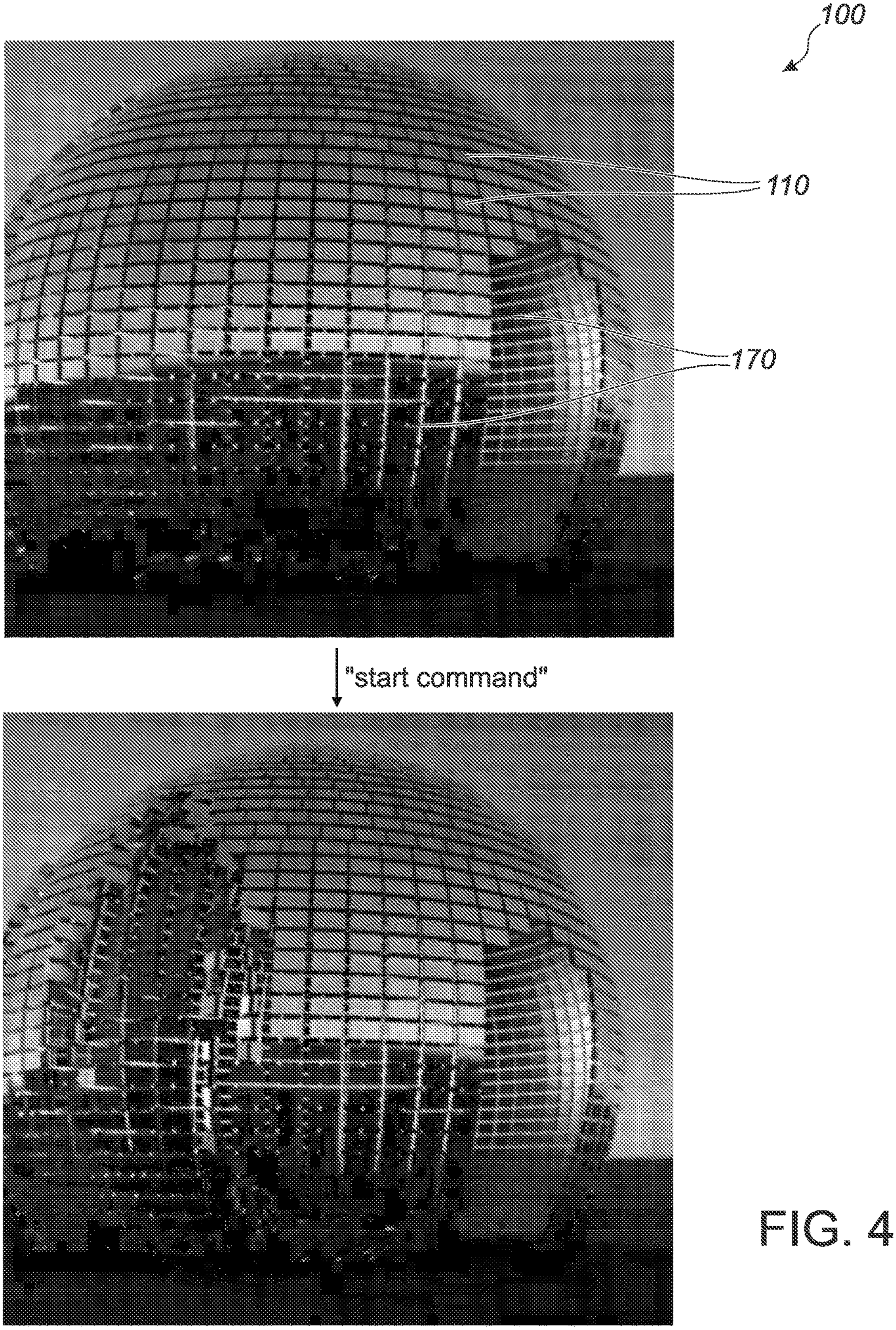
FIG. 4 is a flowchart representation of one variation of the system.

As shown in FIG. 4, a set of brixel units 110 can be similarly installed on a non-planar surface. For example, groups of mounting brackets 170 can be assembled into columns defining nonlinear (e.g., curvilinear, semicircular) profiles, and these nonlinear columns can be assembled to form a mounting bracket 170 assembly. Brixel units 110 can then be installed in these mounting brackets 170 such that pixel elements 112 in these brixel units 110 cooperate to: interpolate a smooth, non-planar (e.g., a three-dimensional) surface when occupying nominal "home" positions, as shown in FIG. 4; and form a "textured" non-planar surface when offset from their nominal "home" positions.

11. Setup and Calibration

Once an array of brixel units 110 is installed on a display surface, the brixel units 110 can execute calibration routines to calibrate angular positions of their pixel elements 112.

In one implementation, after an array of brixel units 110 is installed on a display surface, a technician manually manipulates pixel elements 112 in these brixel units no in order to locate first faces 113 of these pixel elements 112 on a continuous plane (or on a contiguous surface). The technician then triggers the primary controller 160 to initiate calibration routines at these brixel units 110. Upon receipt of this trigger, the primary controller 160 distributes calibration routine commands to the column controllers 150, each of which distributes calibration triggers to its connected brixel units 110.

Upon receipt of a calibration trigger, a local controller 120 in a brixel unit 110: drives the motor 138 in a forward direction to rotate the pixel element 112; records a count of motor steps completed by the motor 138 during this rotation; records a count of encoder ticks output by the rotary encoder during this rotation; and monitors outputs of the home sensor. In response to detecting a change in output of the home sensor—which indicates proximity of the position indicator to the home sensor—the local controller 120: records the current motor step count as a motor step calibration offset; and records the current encoder tick count as an encoder tick calibration offset.

Later during operation, the brixel unit 110 can "home" the pixel element 112 (i.e., align the first face 113 of the pixel element 112 with the continuous plane) by: driving the motor 138 in the forward direction to rotate the pixel element 112; monitoring the output of the home sensor; and then reversing the motor 138 through a set of steps equal to the motor step calibration offset and confirming that a quantity of encoder ticks output by the rotary encoder during this reverse operation (approximately) equals the encoder tick calibration offset.

Furthermore, when executing an actuation routine, the local controller 120 can monitor the output of the home sensor and recalculate a home position of the pixel element 112—when the output of the home sensor indicates proximity of the position indicator as the motor 138 is driver in the forward direction—by subtracting the motor step calibration offset from the current motor step count and by subtracting the encoder tick calibration offset from the current encoder tick count.

In a similar implementation, each brixel unit 110 includes: a wireless communication module 126; and a home sensor 124 configured to output a signal corresponding to a reference angular position of a pixel element 112 of the brixel unit 110. In this implementation, a local controller 120 in a brixel unit 110: stores a home position of a pixel element 112 in the brixel unit 110 that triggers output of a signal from a home sensor 124 in the brixel unit 110; receives a stream of orientation values from an external position sensor, temporarily mated to a first face 113 of the pixel element 112 of the brixel unit 110, via the wireless communication module 126; drives a motor 138 in the brixel unit no according to a difference between the stream of orientation values and a target home orientation (i.e., to reduce this difference); and stores an angular offset (e.g., in the form of a count of encoder ticks or motors 130 steps) between the home position and an angular position of the pixel element 112 corresponding to receipt of an orientation value—in the stream of orientation values received from the external position sensor—approximating the target home orientation. Later, during operation, the local controller 120 drives the motor 138 in the brixel unit 110 to locate the pixel element 112 over a sequence of angular positions—defined by an assigned actuation routine—relative to the angular offset.

However, a brixel unit 110 can calibrate the angular position of its pixel element 112 and its motor 138 in any other way.

12. Actuation Routine Generation

A computing device (e.g., a smartphone, a tablet a laptop computer) executing a user portal and/or a remote computer system can interface with a user to generate a set of actuation routines for brixel units 110 in the installation.

12.1 Color Video

In one implementation, to generate actuation routines for an installation of brixel units 110, an operator: uploads a color video—including multiple frames spanning multiple seconds, minutes, or hours—to the user portal; and enters a geometry of the installation (e.g., a quantity of brixel unit 110 column, a quantity of brixel unit 110 rows, a width and height of each pixel element 112, and/or a pitch height and pitch width between adjacent brixel units 110) at the user portal. The computing device (or a remote computer system, etc.) then: converts the color video to grayscale, such as with each pixel including a value between "0" and "255"; crops or adjusts the grayscale video to an aspect ratio (i.e., a width to height ratio) equal to an aspect ratio of the installation; and downsamples the video to a frame rate equal to an update rate of brixel units 110 in the installation (e.g., 1 Hz).

In this implementation, the computing device then compresses frames in the downsampled grayscale video to a number of rows and columns of pixels equal to a number of rows and columns of brixel units 110 in the installation such that each pixel in each frame in the video corresponds to one brixel unit 110 in the installation. For example, the computing device can select a cluster of pixels—in a first grayscale frame in the grayscale video—that spans a geometry approximating a geometry of a corresponding brixel unit 110 in the installation, such as a 20-pixel-tall, 80-pixel-wide rectangular cluster of pixels for a brixel unit 110 that includes two-inch-tall, eight-inch-wide pixel element 112. The computer system can then: average the grayscale values in this pixel cluster; store this average grayscale value in a single corresponding pixel in a first compressed frame; and repeat this process for each other cluster of pixels in the first grayscale frame to complete the first compressed grayscale frame. The computing device can repeat this process for each other grayscale frame in the grayscale video in order to transform the grayscale video into a sequence of compressed grayscale frames.

Then, for a first pixel—in this sequence of compressed grayscale frames—corresponding to a first brixel unit 110 in the installation, the computing device can: extract an ordered sequence of grayscale color values from the first pixel in this sequence of compressed grayscale frames; store the ordered sequence of grayscale color values in a table or other singular file format; store this table in an actuation routine for the first brixel unit 110; and write a scalar time value—representing a time offset (e.g., in milliseconds) between consecutive grayscale color values—to this actuation routine. The computing device can repeat this process for each other pixel in the sequence of compressed grayscale frames in order to transform the compressed grayscale video into an actuation routine for each other brixel unit 110 in the installation, wherein each actuation routine: defines a singular file; is tagged with a position or identifier of the corresponding brixel unit 110 in the installation; and includes a sequence of values (e.g., from "0" to "255") corresponding to grayscale values of a corresponding pixel in the sequence of compressed grayscale frames thus generated from the original color video.

12.2 Still Images

In a similar implementation, the user portal ingests a set of still images—such as human portraits or still images of corporate iconography—uploaded by the user and records a dwell time for these still images entered by the user. The computing device (or the remote computer system) then implements the foregoing methods and techniques to convert each still image into a grayscale image sized to an aspect ratio of the brixel unit no installation and compressed to the arrangement of brixel units 110 in the installation. The computing device then: compiles grayscale values from a particular pixel location in each frame into one actuation routine for a corresponding brixel unit 110; writes a dwell time for each grayscale value to the actuation routine; and repeats this process for each other pixel location in this set of compressed grayscale images to generate an actuation routine for each other brixel unit 110 in the installation.

12.3 Preexisting Patterns

Alternatively, rather than transform an existing video into a discrete actuation routine for each brixel unit 110, the user portal can prompt the user to select a pattern from a menu of preexisting patterns, such as: a "linear wave" pattern; a "spiral wave" pattern; a "shimmer" pattern; an "earthquake" pattern; or a "snake" pattern." The user portal can also prompt the user to confirm a pattern speed and an actuation duration (e.g., in second, minutes, hours, or days). The computing device can then: retrieve a sequence of grayscale frames representing the selected pattern; duplicate the sequence of grayscale frames based on the selected actuation duration; and adjust the sequence of grayscale frames to the aspect ratio of the brixel unit 110 installation and compressed to the arrangement of brixel units 110 in the installation. The computing device can then: compile grayscale values from a particular pixel location in each frame into one actuation routine for a corresponding brixel unit 110; write a speed or dwell time for each grayscale value to the actuation routine based on the pattern speed selected by the user; and repeat this process for each other pixel location in this set of compressed grayscale images to generate an actuation routine for each other brixel unit 110 in the installation.

12.4 Actuation Routine Contents

In the foregoing implementations, the computing device can generate an actuation routine that specifies, for a brixel unit 110, sequences of: absolute angular positions (e.g., 32-bit representations of angular offsets in degrees from a home position); relative angular moves (e.g., 32-bit representations of angular offsets from a last angular position occupied by the brixel unit 110); angular speeds; angular accelerations; angular decelerations; directions of angular motion; absolute or relative "stop and go" positions; durations of continuous motion periods; durations of stop and go intervals; and/or motion profiles containing the foregoing parameters and spanning durations of time (e.g., multiple seconds, minutes, or hours). For example, the computing device can generate an actuation routine in the form of a single "frame," which can be uploaded to the primary controller 160 and distributed to a corresponding local controller 120 in one brixel unit no in an installation via a column controller 150. The brixel unit 110 can thus load this actuation routine and execute angular positions, speeds, and accelerations over periods of time specified in this actuation routine independently of other brixel units 110 in the installation concurrently executing their own stored actuation routines. For example, each brixel unit 110 in the installation can execute its own assigned actuation routine independently of each other brixel unit 110 in the installation over a period of minutes or hours based on an internal clock (e.g., a quartz clock) in the brixel unit 110 and then time-synchronize itself to the primary controller 160—and thus other brixel units 110 in the installation—only after loading a new actuation routine minutes or hours later (or only upon receipt of a command to repeat the loaded actuation routine from the primary controller 160 some minutes or hours later).

However, the user portal, the computing device, and/or the remote computer system can generate an actuation routine for each brixel unit 110 in the installation in any other way.

13. Operation

The user may then upload a set of actuation routines to the primary controller 160, such as physically connecting the mobile device to the primary controller 160, wirelessly transmitting the set of actuation routines from the mobile device to the primary controller 160, or triggering upload of the set of actuation routines from a remote database to the primary controller 160 via a computer network (e.g., the Internet). The primary controller 160 can then distribute these actuation routines to column controllers 150 in the installation, and these column controllers 150 can disperse these actuation routines to their connected brixel units 110 as described above, and each brixel unit 110 can store its actuation routine in local memory. Once these actuation routines are loaded onto their corresponding brixel units 110, the primary controller 160 and column controllers 150 can distribute actuation triggers to these brixel units 110 responsive to receipt of a command from the technician to begin operation (e.g., via a physical button on the primary controller 160 or via the user portal executing on the computing device connected to the primary controller 160).

Responsive to receipt of an actuation trigger, a brixel unit 110 in the installation can: initiate a first actuation cycle for a duration based on the update rate of the installation (e.g., a one-second actuation cycle for a 1 Hz update rate); extract a first grayscale value from its stored actuation routine; and convert this first grayscale value into a target angular position of the pixel element 112. For example, the brixel unit 110 can: convert a "0" grayscale value to a target angular position of 0°, which corresponds to "0" motor steps from a home position for a 1000-step stepper motor 138 and "0" encoder ticks from a home position for a 512-tick rotary encoder; convert a "63" grayscale value to a target angular position of 45°, which corresponds to "125" motor steps and "64" ticks from the home position; convert a "127" grayscale value to a target angular position of 90°, which corresponds to "250" motor steps and "128" ticks from the home position; and convert a "256" grayscale value to a target angular position of 180°, which corresponds to "500" motor steps and "256" ticks from the home position. (Alternatively, the user portal can convert grayscale values into angular positions of pixel elements 112 when generating an actuation routine as described above.) The brixel unit 110 can then calculate a target motor step offset and a target encoder tick offset to achieve the target angular position in this first actuation cycle based on differences between: the current motor step and encoder tick count from the home position (e.g., "0" motor steps and "0" encoder ticks if the pixel element 112 is currently occupying the home position); and the target angular position in motor steps and encoder ticks.

In particular, the local controller 120 in the brixel unit 110 can calculate a first motor step offset by subtracting the current position of the pixel element 112 in motor steps from the home position from the target quantity of motor steps from the home position represented in the first grayscale value in the actuation routine. The local controller 120 can also calculate a second motor step offset by subtracting the target quantity of motor steps from the home position represented in the first grayscale value in the actuation routine from the current position of the pixel element 112 in motor steps from the home position. The local controller 120 can then select one of the first motor step offset and the second motor step offset representing the lowest absolute value and store this motor step offset as a target motor step offset for this first actuation cycle. Similarly, the local controller 120 can calculate a first encoder tick offset by subtracting the current position of the pixel element 112 in encoder ticks from the home position from the target quantity of encoder ticks from the home position represented in the first grayscale value in the actuation routine. The local controller 120 can also calculate a second encoder tick offset by subtracting the target quantity of encoder ticks from the home position represented in the first grayscale value in the actuation routine from the current position of the pixel element 112 in encoder ticks from the home position. The local controller 120 can then select one of the first encoder tick offset and the second encoder tick offset representing the lowest absolute value and store this encoder tick offset as a target encoder tick offset for the first actuation cycle.

The local controller 120 in the brixel unit 110 can then: drive the motor 138 a number of steps equal to the absolute value of the target motor step offset and in a direction corresponding to the sign of the target motor step offset; and verify that the pixel element 112 has reached the target angular position represented by the first grayscale value in the actuation routine if the number of ticks output by the rotary encoder during this first actuation cycle (approximately) equals the target encoder tick offset.

Furthermore, in this implementation, the local controller 120 can drive the motor 138 at a maximum speed (e.g., a “rapid speed”) to the target motor 138 step offset and then hold the motor 138 in this target angular position for the remainder of this first actuation cycle. Alternatively, the local controller 120 can calculate an angular speed of the motor 138 that will achieve this target motor step offset by the conclusion of the first actuation cycle (e.g., over a duration of one second)—such as up to the maximum speed of the motor 138—and then drive the motor 138 through this target motor step offset at this angular speed during the first actuation cycle. During this first actuation cycle, if the brixel unit 110 drives the position indicator in the pixel element 112 past the position sensor, then the local controller 120 can update its record of the current absolute position of the pixel element 112 according to a change in output of the position sensor in order to account for possible loss of motor steps and encoder ticks during operation.

The local controller 120 can repeat the foregoing process: to calculate a next target motor step offset based on a next grayscale value in the actuation routine; and to drive the motor 138 through this next target motor step offset during this next actuation cycle. In particular, the local controller 120 can repeat this process until it reaches the last grayscale value in the actuation routine.

Upon reaching the conclusion of the actuation routine, the local controller 120 can: repeat the actuation routine from the first grayscale value forward; repeat the actuation routine from the last grayscale value backward; or return to the home position. Additionally or alternatively, upon reaching the conclusion of the actuation routine, the local controller 120 can also return confirmation of the actuation routine to the column controller 150, which can return such confirmation to the primary controller 160. Upon receipt of such confirmation from all brixel units 110 in the installation, the primary controller 160 and column controllers 150 can repeat the foregoing processes to distribute next actuation routines to the brixel units 110 in the installation and to trigger execution of these actuation routines by these brixel units 110.

Alternatively, rather than upload an actuation routine that includes pixel element 112 data spanning multiple actuation cycles (or “refresh periods”) of the installation, the primary controller 160 can: ingest a live or prerecorded stream of frames (e.g., a live video feed from a connected camera); implement methods and techniques described above to transform a current frame in this stream into a one grayscale value or target angular position for each brixel unit 110 in the assembly; and stream these grayscale values or target angular positions to the column controllers 150, which then stream these grayscale values or target angular positions to their connected brixel units 110. In this implementation, each brixel unit 110 can then implement the foregoing methods and techniques to automatically drive its pixel element 112 to the angular position thus received from its column controller 150.

13.1 Target Angular Position Sequence

In one example, a local controller 120 in a brixel unit 110, in the set of brixel units 110: reads a first target angular position from an actuation routine assigned to the brixel unit 110 by the primary controller 160; reads a first angular speed profile from the actuation routine; reads a first direction from the actuation routine; receives a start command issued by the primary controller 160 (such as separate from or coextensive (i.e., the same as) the actuation routine); and drives a motor 138 of the brixel unit 110 to rotate a pixel element 112 of the brixel unit 110 from a current angular position to the first target angular position along the first direction and according to the first angular speed profile responsive to receiving the start command (or responsive to receiving the actuation routine, receipt of which by the local controller 120 represents a “start command”). The local controller 120 then: reads a second target angular position from the actuation routine; reads a second angular speed profile from the actuation routine; reads a second direction from the actuation routine; and drives the motor 138 to rotate the pixel element 112 from the first angular position to the second target angular position along the second direction and according to the second angular speed profile.

In this example, in response to conclusion of an actuation routine assigned to the brixel unit 110 by the primary controller 160, the local controller 120 can: drive the motor 138 of the brixel unit 110 to rotate the pixel element 112 of the brixel unit 110 to a start (or “home”) angular position; and return confirmation of conclusion of the actuation routine to the primary controller 160, via the column (or “group”) controller.

The primary controller 160 can then issue a second actuation routine to the brixel unit 110 and transmit a second start command (separate from or contiguous with the second actuation routine) to the brixel unit 110—and to other brixel units 110 in the system 100, via their connected column controllers 150—to initiate execution of their assigned actuation routines. The local controller 120 can then: receive its second actuation routine—thus assigned to it by the primary controller 160—via its column controller 150; read a third target angular position from the second actuation routine; read a third angular speed profile from the third actuation routine; read a third direction from the third actuation routine; receive the second start command issued by the primary controller 160 (or contiguous with the second actuation routine); and drive the motor 138 of the brixel unit 110 to rotate the pixel element 112 from the start (or “home”) angular position to the third target angular position along the third direction and according to the third angular speed profile responsive to receiving the second start command (or responsive to receiving the second actuation routine, receipt of which by the local controller 120 represents a second “start command”).

Thus, in this implementation, a local controller 120 of a brixel unit 110 can drive the motor 138 and pixel element 112 in this brixel unit 110 through a sequence of angular positions—and in particular forward and/or reverse directions—defined in an actuation routine assigned to the brixel unit 110 and received from the primary controller 160 via a connected column controller 150.

13.2 Target Angular Position Sequence

Additionally or alternatively, a local controller 120 in a brixel unit 110, in the set of brixel units 110: reads a first acceleration profile and a first deceleration profile from the actuation routine; reads a first rotation duration from the actuation routine; reads a first direction from the actuation routine; and receives a start command issued by the primary controller 160 (or interprets receipt of the actuation routine generally as the start command). During a first rotation duration, the local controller 120 then: accelerates a motor 138 of the brixel unit 110 according to the first acceleration profile to rotate the pixel element 112 in the first direction responsive to receiving the start command (or responsive to receiving the actuation routine method or technique generally); and decelerates the motor 138 according to the first deceleration profile.

Similarly, the local controller 120 can: read a second acceleration profile and a second deceleration profile from the actuation routine; read a second rotation duration from the actuation routine; and read a second direction from the actuation routine. Then during the second rotation duration succeeding the first rotation duration, the local controller 120 can: accelerate the motor 138 according to the second acceleration profile to rotate the pixel element 112 in the second direction; and decelerate the motor 138 according to the second deceleration profile.

Thus, in this implementation, a local controller 120 of a brixel unit 110 can drive the motor 138 and pixel element 112 in this brixel unit 110 through a sequence of acceleration and deceleration profiles—and in particular forward and/or reverse directions—defined in an actuation routine assigned to the brixel unit 110 and received from the primary controller 160 via a connected column controller 150.

13.3 Rotation Count

In a similar implementation, a local controller 120 in a brixel unit 110, in the set of brixel units 110: reads a first acceleration profile and a first deceleration profile from the actuation routine; reads a first rotation count from the actuation routine; reads a first direction from the actuation routine; and receives a start command issued by the primary controller 160 (or interprets receipt of the actuation routine as the start command). During a first rotation period, the local controller 120: accelerates a motor 138 of the brixel unit 110 according to the first acceleration profile to rotate the pixel element 112 in the first direction responsive to receiving the start command (or the actuation routine more generally); drives the motor 138 to rotate the pixel element 112 over the first rotation count; and decelerates the motor 138 according to the first deceleration profile. The local controller 120 then: reads a second acceleration profile and a second deceleration profile from the actuation routine; reads a second rotation count from the actuation routine; and reads a second direction from the actuation routine. During the second rotation period succeeding the first rotation period, the local controller 120 then: accelerates the motor 138 according to the second acceleration profile to rotate the pixel element 112 in the second direction; drives the motor 138 to rotate the pixel element 112 over the second rotation count; and decelerates the motor 138 according to the first deceleration profile.

Thus, in this implementation, a local controller 120 of a brixel unit 110 can drive the motor 138 and pixel element 112 in this brixel unit 110 through a target count of (full and partial) rotations—and in particular forward and/or reverse directions and according to particular acceleration and deceleration profiles—defined in an actuation routine assigned to the brixel unit 110 and received from the primary controller 160 via a connected column controller 150.

However, the primary controller 160, column controllers 150, and brixel units 110 in this installation can implement any other method or technique to depict a set of pre-recorded, pre-generated, or live frames.

14. Variation: Freestanding System

In one variation shown in FIGS. 5A-5C and 6, a set of brixel units 110 are assembled into a freestanding display. In this variation, the system 100 can include: a center column 180; a bearing collar 186; a base 190; a brixel unit 110; a motor 138; a local controller 120; and a column controller 150.

The center column 180 includes a cylindrical tube 182 and defines a column of drive windows 184 with adjacent drive windows 184 offset at a vertical pixel pitch distance. The base 190 is configured to support the center column 180 and houses the column controller 150. The bearing collar 186 is coupled to the center column 180 adjacent a drive window 184 and defines a vertical thrust surface.

The brixel unit 110 includes: a pixel element 112; an internal ring gear 146; and a bearing housing 148. The pixel element 112 includes: a first face 113 defining a first visual characteristic; and a second face 114 opposite the first face 113 and defining a second visual characteristic. The internal ring gear 146 is coupled to the pixel element 112 and defines an axis of rotation parallel to a vertical axis of the pixel element 112 (e.g., a "C4 axis" of the pixel element 112). The bearing housing 148: is coupled to the pixel element 112; is configured to carry a vertical load of the brixel unit 110 into the vertical thrust surface of the bearing collar 186; and rotationally couples the brixel unit 110 to the center column 180.

The motor 138 is arranged in the drive window 184 within the center column 180. A rotary encoder (or other angular position sensor) is coupled to the output shaft of the motor 138 (or to the drive pinion 142) and outputs a signal representative of changes in angular position of the output shaft of the motor 138—and therefore representative of changes in angular position of the output shaft of the motor 138. A drive pinion 142: is coupled to the output shaft of the motor 138; is configured to rotate about a rotational axis offset from the cylindrical axis of the center column 180; and defines a set of teeth extending through the drive window 184 to engage teeth in a segment of the internal ring gear 146 of the brixel unit 110.

The local controller 120: receives an actuation routine from the column controller 150; includes local memory configured to store an actuation routine; and is configured to drive the motor 138 according to target angular positions represented in an actuation routine stored in local memory.

In a similar variation, the system 100 includes: a center column 180 including a tube 182 and defining a column of drive windows 184 arranged along the tube 182 at a vertical pixel pitch distance; a set of bearing collars 186, each bearing collar 186 in the set of bearing collars 186 coupled to the center column 180 adjacent a drive window 184, in the column of drive windows 184, and defining a vertical thrust surface; a set of brixel units 110; and a primary controller 160 configured to distribute a set of actuation routines to the set of brixel units 110. In this variation, each brixel unit 110 is located adjacent a drive window 184, in the set of drive windows 184 on the center column 180, and includes: a pixel element 112 including a first face 113 defining a first visual characteristic and a second face 114 opposite the first face 113 and defining a second visual characteristic different from the first visual characteristic; an internal ring gear 146 coupled to the pixel element 112 and defining an axis of rotation of the pixel element 112; and a bearing housing 148 coupled to the pixel element 112, configured to carry a vertical load of the pixel element 112 into a vertical thrust surface of a bearing collar 186, in the set of bearing collars 186, adjacent the drive window 184, and rotationally coupling the pixel element 112 to the center column 180; a motor 138 arranged in the drive window 184; a drive pinion 142 coupled to the output shaft of the motor 138 and extending through the drive window 184 to engage the internal ring gear 146; and a local controller 120 configured to store an actuation routine in local memory at the brixel unit 110 and configured to drive the motor 138 to locate the pixel element 112 over a sequence of angular positions, relative to the center column 180, defined by the actuation routine.

14.1 Center Column and Base

In this variation, the center column 180 can include a tube 182 defining a column of drive windows 184 spaced along the length of the steel tube at a pitch distance equal to a target vertical pitch distance between pixel elements 112 of vertically-adjacent brixel units 110 installed along the center column 180. For example, the center column 180 can include a contiguous steel tube of fixed length defining a fixed number of drive windows 184. In particular, in this example, the center column 180 can include a continuous cylindrical tube 182 relieved to form the column of drive windows 184 along a length of the continuous cylindrical tube 182; and a pixel element 112 of a brixel unit 110 can be configured to rotate about a rotation axis coaxial with the continuous cylindrical tube 182.

Alternatively, the center column 180 can be assembled from a set of center column 180 elements, each defining one drive window 184 (or a small set of drive windows 184). For example, these center column 180 elements can be fastened together, screwed together, or otherwise assembled to form a center column 180 with a target quantity of drive windows 184.

The center column 180 be similarly screwed, fastened, or otherwise assembled onto the base 190, and the column controller 150 can be arranged in the bottom of the center column 180 or in the base 190.

14.2 Bearing Collar

In one implementation, a bearing collar 186 includes a continuous annular ring defining an internal bore of diameter sized for a running fit over the center column 180. The bearing collar 186 can also include a setscrew configured to lock the bearing collar 186 to the center column 180 adjacent a drive window 184.

Furthermore, the top face of the bearing collar 186 defines the thrust surface configured to mate with and vertically support a downward-facing thrust bearing surface defined by the bearing housing 148 in the brixel unit 110. The external cylindrical face of the bearing collar 186 can similarly define a rotational bearing surface sized for a running fit inside the bearing housing 148 and can mate with the bearing housing 148 of the brixel unit 110, thereby locating the brixel unit 110 and enabling the brixel unit 110 to rotate about the center column 180. In particular, the bearing collar 186 can cooperate with the bearing housing 148 of the brixel unit 110 to constrain the brixel unit 110 in five degrees of freedom and to enable the brixel unit 110 to rotate about the center axis of the center column 180.

In another implementation, the bearing collar 186 includes a one-piece or two-piece split collar configured to clamp to the center column 180; and a flanged bearing or bushing can be located over the bearing collar 186 once the bearing collar 186 is clamped to the center column 180 to form the thrust surface and external rotational bearing surface described above.

14.3 Brixel Unit

As described above, the pixel element 112 of a brixel unit 110 can include two clamshell structures assemblable into a cuboid shell. In this implementation, a top face of the pixel element 112 can define an upper opening concentric with a center vertical axis (e.g., the C4 axis) of the cuboid shell and larger than the outer diameter of the center column 180, and the lower face of the pixel element 112 can similarly define a lower opening concentric with the upper opening and the center vertical axis of the cuboid shell and of similar size.

The bearing housing 148 of the brixel unit 110 defines an annular, downward-facing thrust bearing surface and a cylindrical, inward-facing rotational bearing surface. The bearing housing 148 can be arranged inside the cuboid shell—such as proximal the bottom face of the pixel element 112—and can be fastened, adhered, or otherwise assembled onto one or both clamshell structures of the pixel element 112 with the annular thrust bearing surface and the rotational bearing surface concentric with the center vertical axis of the cuboid shell.

The internal ring gear 146 includes a set of inwardly-facing involute gear teeth configured to mate with the drive pinion 142. In one implementation shown in FIGS. 5B and 5C, the internal ring gear 146 is configured to fasten to a lower face of the bearing housing 148 to encompass the bearing collar 186. In this implementation, the internal ring gear 146 can be interposed between the bearing housing 148 and the bottom face of the cuboid shell and can be fastened directly to the one or both clamshell structures of the cuboid shell in order to enclose the bearing collar 186, thereby preventing the brixel unit 110 from being lifted off of the bearing collar 186 if handled by a user.

In the foregoing implementations, the brixel unit 110 can also include: a thrust washer or thrust bearing interposed between the annular, downward-facing thrust bearing surface and the thrust surface of the bearing housing 148; and a needle or ball bearing interposed between the cylindrical, inward-facing rotational bearing surface of the bearing housing 148 and the bearing collar 186. Additionally or alternatively, the brixel unit 110 can include a spring washer interposed between the annular, downward-facing thrust bearing surface and the thrust surface of the bearing housing 148 in order to fill a vertical gap between adjacent surfaces in the bearing housing 148 and the bearing collar 186.

14.3.1 Bearing Housing Variations

In one variation, the brixel unit 110 includes a second bearing housing 148, such as arranged above the (first) bearing housing 148 described above and configured to rotationally couple the top face of the brixel unit 110 to the center column 180 and thus maintain concentricity of the vertical axis of the pixel element 112 and the center axis of the center column 180. In this variation, the second bearing housing 148 can include a bushing or bearing configured to mate directly with an exterior surface of the center column 180 or with a second bearing collar 186 installed on the center column 180.

In another variation, rather than define discrete thrust and rotation bearing surfaces, the bearing collar 186 supports a tapered bearing (or defines a tapered bushing surface), and the bearing housing 148 includes a tapered bearing race configured to mate with the tapered bearing (or the tapered bushing surface) to support the brixel unit 110 vertically on the center column 180 and to rotationally couple the brixel unit 110 to the center column 180.

14.4 Drive System

As described above, the motor 138 can include a stepper motor 138, a servo motor 138, or a brushed or brushless DC motor 138. Generally, the motor 138 is located in the drive window 184 and is arranged (predominantly, fully) inside of the center column 180.

For example, the motor 138 can be fastened directly to the center column 180 with a set of threaded fasteners passing through the center column 180 adjacent the drive window 184. Alternatively, the motor 138 can be installed in a carriage, and the carriage can be installed in the drive window 184 and fastened to the center column 180. Yet alternatively, the motor 138 can be loosely inserted into the drive window 184 with its output shaft facing downward; and the bearing collar 186 can be slid down the center column 180, over the drive window 184, and over the body of the motor 138 with the bottom face of the bearing collar 186 adjacent and facing the pinion. The bearing collar 186 can then be fastened to both the center column 180 and the body of the motor 138 in order to rigidly couple the motor 138 to the center column 180.

In one implementation, the pinion is mounted directly to the output shaft of the motor 138, and the motor 138 is located in the center column 180 with the rotational axis of its output shaft laterally offset from the center axis of the center column 180 such that a sector of the pinion extends through the drive window 184 to mesh with teeth in a sector of the internal ring gear 146. Thus, actuation of the motor 138 directly rotates the pinion, which then rotates the internal ring gear 146 and the pixel element 112 about the center axis of the center column 180.

In another implementation, the motor 138 is located in the center column 180 with the rotational axis of its output shaft coaxial with the center axis of the center column 180. In this implementation, a sun gear can be mounted to the output shaft of the motor 138, and the pinion (e.g., a planetary gear) can be interposed between the sun gear and the internal ring gear 146 to transfer torque from the motor 138 into the brixel unit 110 to rotate the brixel unit 110. In this implementation, the system 100 can also include multiple pinions—such as a second pinion radially offset 180° from the (first) pinion—configured to transfer torque from the motor 138 into the internal ring gear 146 in order to rotate the brixel unit 110.

Thus, in this implementation, the output shaft of a motor 138, a drive pinion 142, and an internal ring gear 146 of a brixel unit 110 can define a planetary gearbox assembled over and extending through the tube 182 of the center column 180 at a drive window 184 (or "aperture") in the center column 180.

14.5 Local Controller and Position Sensor

Furthermore, a local controller 120, such as described above, can be arranged inside the center column 180. For example, the local controller 120 can be mounted to the motor 138 opposite the motor's 138 output shaft.

The system 100 can also include a light element 122—such as an LED ring—mounted to the exterior of the center column 180 and configured to illuminate the interior of the pixel element 112 or a space between the pixel element 112 and a pixel element 112 of an adjacent brixel unit 110. In this variation, the light element 122 can be connected to and controlled via the local controller 120.

For example, a pixel element 112 of a brixel unit 110 can include: a first face 113 defining a first optical transparency; and a second face 114 defining a second optical transparency less than the first optical transparency. In this example, the brixel unit 110 can also include a light element 122: coupled to the center column 180 proximal a drive window 184, in the set of drive windows 184; enclosed by a pixel element 112 of the brixel unit 110; and configured to illuminate the interior of the pixel element 112, which includes faces that exhibit different transmission of light output by the light element 122.

Furthermore, the system 100 can include a home sensor and a position indicator, such as described above. For example, the home sensor can include a Hall effect sensor arranged in the bearing collar 186; and the position indicator can include a magnetic element arranged in the bearing housing 148 in the brixel.

14.6 Multi-Unit Column Assembly

As described above, the center column 180 can define a linear array of drive windows 184 offset along the length of the center column 180 at a vertical pitch distance equal to a target offset between adjacent brixel unit 110 pixel elements 112 (e.g., a sum of the height of a pixel element 112 and a target gap between adjacent top and bottom faces of pixel elements 112 in two adjacent brixel units 110).

Figure 5A:
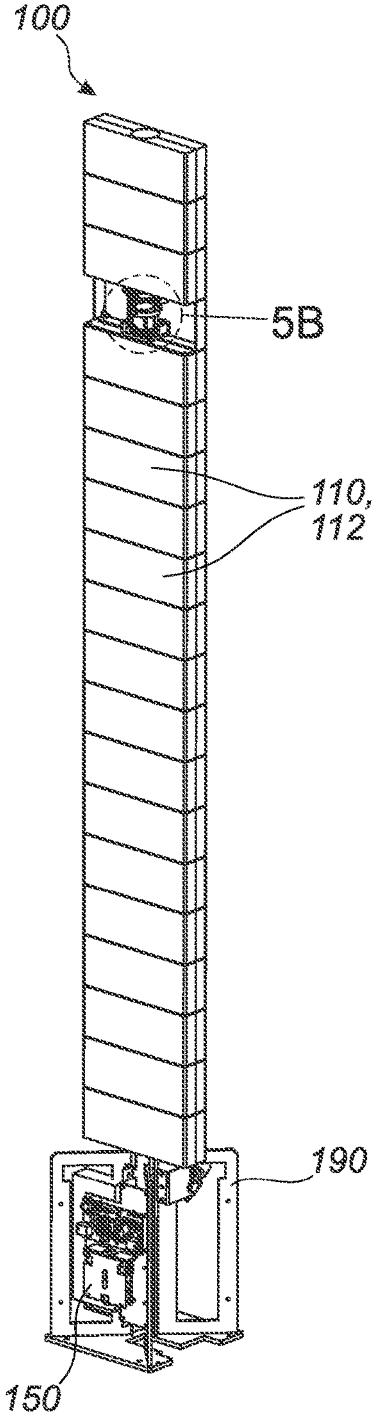
FIGS. 5A, 5B, and 5C are schematic representations of one variation of the system.
Figure 5B:
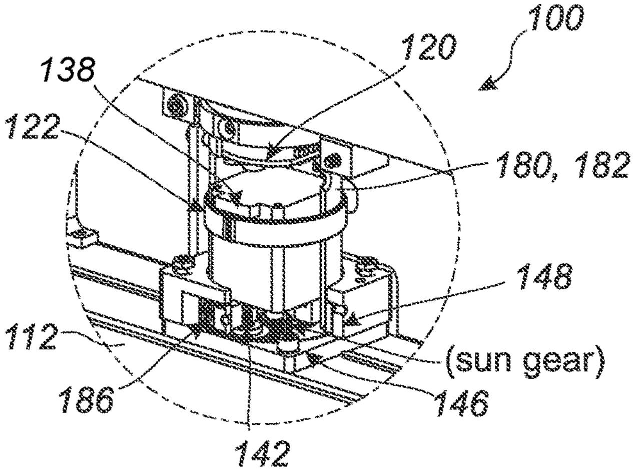
Figure 5C:
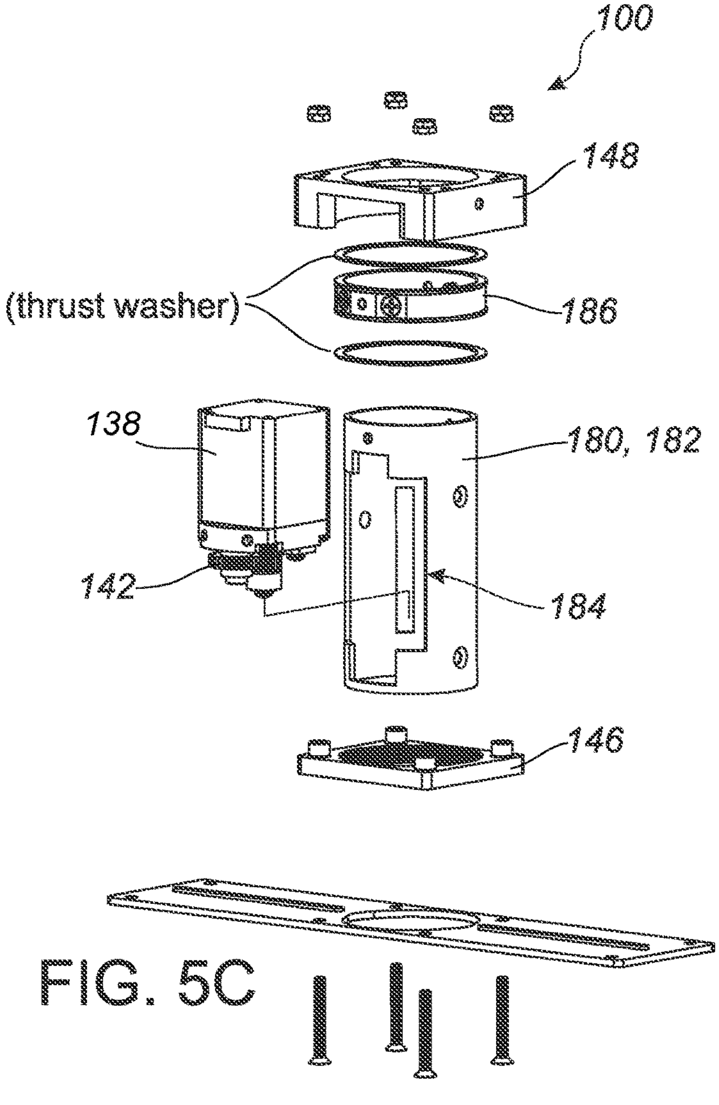

In one example shown in FIGS. 5B and SC, to assemble a column of brixel units 110 on a center column 180, the center column 180 is first mounted to the base 190 or other support structure, and a column controller 150 is installed in the base 190. A first wiring harness—including power and digital control lines and connected to a first local controller 120—is inserted into a first drive window 184 at the bottom of the center column 180, fed downward toward the base 190, and connected to the column controller 150. The first local controller 120 and a first motor 138 are loosely inserted into the drive window 184 with a first pinion—coupled to the output shaft of the first motor 138—facing downward toward the bottom of the center column 180. A first internal ring gear 146 is then lowered from the top of the center column 180 downward toward the first drive window 184 and loosely located adjacent the first pinion. A first lower thrust washer is slid from the top of the center column 180 downward to the drive window 184, followed by a first bearing collar 186. The first bearing collar 186 is located over the first drive window 184 and faces the pinion with the lower thrust washer located between the internal ring gear 146 and the bearing collar 186. The bearing collar 186 is then fastened to both the center column 180 and the body of the first motor 138 in order to rigidly couple the motor 138 to the center column 180.

A first upper thrust washer and a first spring washer are then lowered from the top of the center column 180 downward to the bearing collar 186, followed by the bearing housing 148. The internal ring gear 146 is then offered up to the bearing housing 148 to enclose the first upper thrust washer, the first spring washer, the first bearing collar 186, and the first lower thrust washer between the internal ring gear 146 and the bearing housing 148; and the internal ring gear 146 is fastened to the bearing housing 148 with a set of threaded fasteners. (A light ring is then slide from the top of the center column 180 downward toward the drive window 184, fastened to the center column 180 above the bearing housing 148, and connected to the local controller 120.)

The foregoing process is then repeated to assemble a second motor 138, a second local controller 120, a second bearing collar 186, a second internal ring gear 146, and a second bearing housing 148 over the second drive window 184 on the center column 180 immediately about the first drive window 184, and a second wiring hardness from the second local controller 120 is connected to a power and data output of the first local controller 120. The process is again repeated for each addition drive window 184 defined by the center column 180 such that these local controllers 120 are connected in series to the column controller 150.

With the motors 130, local controllers 120, bearing collars 186, etc. thus assembled on the center column 180, a pair of pixel element 112 clamshell structures are then fastened to each internal ring gear 146 and/or bearing housing 148 at each drive window 184 on the center column 180 in order to complete assembly of a column of brixel units 110, as shown in FIGURE SA.

Figure 8:
FIG. 8 is a schematic representation of one variation of the system.

In a similar implementation, a set of tubes defining a series of drive windows is assembled to form a non-linear center column, and brixel units are installed over these drive windows to form a non-linear installation, as shown in FIG. 8.

14.7 Multi-Column Assembly

Figure 6:
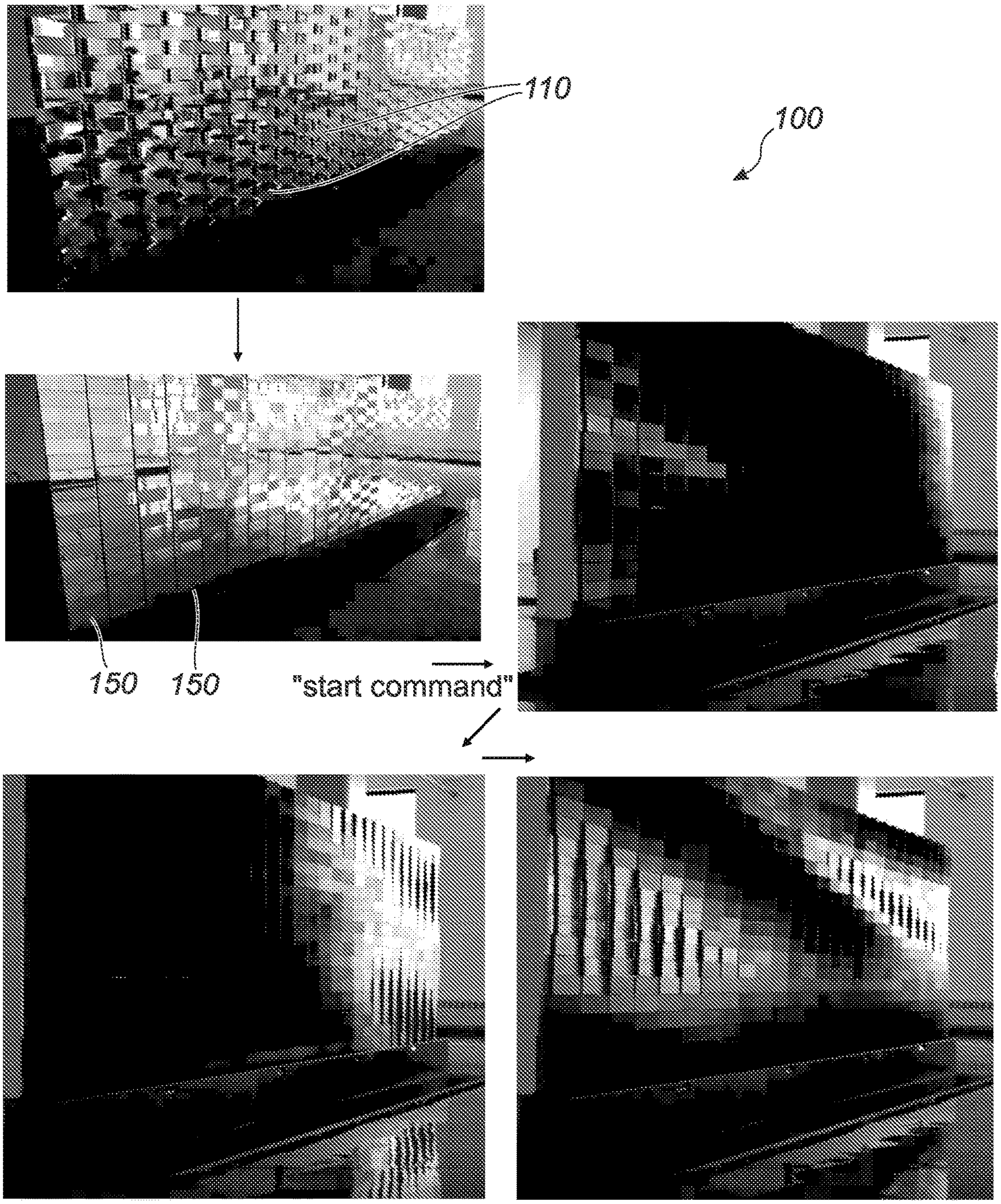
FIG. 6 is a flowchart representation of one variation of the system.

The foregoing process can be repeated to assemble multiple additional columns of brixel units 110. These columns of brixel units 110 can then be installed over a chassis 130, located on a floor or other horizontal surface, suspended from a ceiling or other overhead surface, etc. at a horizontal pitch distance between adjacent center columns 180 equal to a sum of a width of the brixel unit 110 pixel elements 112 and a target horizontal gap between adjacent brixel unit 110 pixel elements 112, as shown in FIG. 6. Column controllers 150 in these columns of brixel units 110 can then be connected to a primary controller 160—such as in series or in parallel—to complete this installation.

Brixel units 110 in this installation can then be calibrated and can execute actuation routines as described above.

Thus, in this variation, the system 100 can include multiple column assemblies, including: a first set of brixel units 110 installed over a first center column 180; and a second set of brixel units 110 installed over a second center column 180; etc. The system 100 can also include a base 190 configured to support and locate the first center column 180 and the second center column 180, etc. in parallel vertical orientations with the second center column 180 laterally offset from the first center column 180 by a horizontal pitch distance approximating a sum of: a width of pixel elements 112 in the set of brixel units 110; and a rotation clearance width (e.g., 0.50" or a function of a thickness) of pixel elements 112 in the set of brixel units 110. Alternatively, adjacent center columns 180 can be fastened together at this horizontal pitch distance, such as to form a freestanding assembly following a linear or serpentine profile.

The primary controller 160 can thus: distribute a set of actuation routines to each set of brixel units 110 arranged on each center column 180; and trigger local controllers 120 in these sets of brixel units 110 to execute their assigned actuation routines via column (or "group") controllers arranged in each center column 180.

17. Other Pixel Element Geometries

In other variations, a pixel element 112 in a brixel unit 110: can include a light pipe; can define non-linear or non-planar surfaces; and/or can include an electronic display on one or both faces. Pixel elements 112 in a cluster or group of brixel units 110 can also form nesting Voronoi geometries.

Furthermore, a pixel element 112 can define additional faces or "facets," such as arranged radially about the rotational axis of the pixel element 112 with different colors and/or textures applied to each face. Similarly, a pixel element 112 can include a cylindrical structure with varying colors and/or textures (e.g., a color wheel or a "texture wheel") applied about the cylindrical face defined by the pixel element 112. In this variation, a local controller 120 in a brixel unit 110 can implement the foregoing methods and techniques to drive the pixel element 112 to an angular position corresponding to a grayscale value (or other value) contained in an actuation routine in order to form a non-binary physical representation of a pixel in an image represented by the installation as a whole.

However, a pixel element 112 can define any other form, geometry, color, texture, or pattern, etc.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
a first center column:
comprising a first tube; and
defining a set of drive windows arranged along the first tube;
a first bearing collar coupled to the first center column adjacent a first drive window, in the set of drive windows; and
a first brixel unit located adjacent the first drive window and comprising:
a first pixel element comprising:
a first face; and
a second face opposite the first face; and
an internal ring gear coupled to the first pixel element and defining an axis of rotation of the first pixel element;
a bearing housing:
coupled to the first pixel element; and
rotationally coupling the first pixel element to the first center column;
a motor arranged in the first drive window;
a drive pinion:
extending through the first drive window to rotationally couple the motor to the internal ring gear; and
a first local controller:
configured to access a first actuation routine; and
configured to drive the motor to locate the first pixel element over a sequence of angular positions, relative to the first center column, defined by the first actuation routine.

2. The system of claim 1, further comprising a primary controller configured to:
access a stream of frames from a camera;
transform each frame in the stream of frames into an angular position, in the sequence of angular positions, of the first pixel element; and
compile the sequence of angular positions into the first actuation routine;
stream the first actuation routine to the first local controller.

3. The system of claim 1:
wherein the first center column defines the set of drive windows arranged along the first tube at a vertical pixel pitch distance; and
further comprising:
a second center column:
arranged adjacent and laterally offset from the first center column;

comprising a second tube; and defining a second set of drive windows arranged along the second tube at the vertical pixel pitch distance; and a second bearing collar coupled to the second center column adjacent a second drive window, in the second set of drive windows; and a second brixel unit located adjacent the second drive window on the second center column.

4. The system of claim 3:

further comprising a base configured to support and locate the first center column and the second center column in parallel vertical orientations;

wherein the second center column is laterally offset from the first center column by a horizontal pitch distance approximating a sum of:

a width of the first pixel element; and a rotational clearance width of the first pixel element.

5. The system of claim 4, wherein the base is mounted onto a horizontal planar surface comprising a ceiling of a structure.

6. The system of claim 3, further comprising a primary controller configured to:

distribute the first actuation routine to the first brixel unit;

distribute a second actuation routine to the second brixel unit;

trigger the first local controller of the first brixel unit to execute the first actuation routine to locate the first pixel element over the sequence of angular positions, relative to the first center column, defined by the first actuation routine; and trigger a second local controller of the second brixel unit to execute the second actuation routine to locate the second pixel element over a second sequence of angular positions, relative to the second center column, defined by the second actuation routine.

7. The system of claim 1, wherein the first local controller is further configured to:

read a first target angular position from the first actuation routine;

read a first angular speed profile from the first actuation routine;

read a first direction from the first actuation routine; and drive the motor of the first brixel unit to rotate the first pixel element from a current angular position to the first target angular position along the first direction and according to the first angular speed profile in response to receiving a start command issued by a primary controller.

8. The system of claim 1, wherein the drive pinion and the internal ring gear of the first brixel unit form a planetary gearbox assembled over and extending through the first drive window of the first center column.

9. The system of claim 1:

wherein the first tube of the first center column comprises a continuous cylindrical tube perforated to form the set of drive windows along a length of the continuous cylindrical tube; and wherein the first pixel element is configured to rotate about the axis of rotation coaxial with the continuous cylindrical tube.

10. The system of claim 1:

wherein the first center column comprises a non-linear center column; and wherein the first tube of the first center column comprises a discontinuous cylindrical tube comprising a set of tube sections joined to form the non-linear center column, wherein each tube section in the set of tube sections defines a drive window, in the set of drive windows.

11. The system of claim 1:

wherein the first face of the first pixel element further defines a first optical transparency;

wherein the second face of the first pixel element further defines a second optical transparency less than the first optical transparency; and wherein the first brixel unit further comprises a light element:

coupled to the first center column proximal the first drive window; and enclosed by the first pixel element.

12. The system of claim 1:

wherein the first face of the first pixel element further defines a first visual appearance;

wherein the second face of the first pixel element further defines a second visual appearance different from the first visual appearance; and wherein the first brixel unit further comprises a light element:

coupled to the first center column interposed between the first drive window and a second drive window, in the set of drive windows, adjacent the first drive window; and configured to illuminate a region between the first pixel element and a second pixel element adjacent the first pixel element.

13. The system of claim 1:

wherein the first face of the first pixel element defines a first light reflectivity;

wherein the second face of the first pixel element defines a second light reflectivity different from the first light reflectivity; and further comprising a light element:

coupled to the first center column proximal the first drive window; and configured to back-light the first pixel element.

14. The system of claim 1:

wherein the first pixel element defines a first geometry; and further comprising a second brixel unit:

located adjacent a second drive window, in the set of drive windows, on the first center column; and comprising a second pixel element defining a second geometry different from the first geometry.

15. The system of claim 1, wherein the motor:

comprises one of a stepper motor; and is fastened to the first center column via a set of threaded fasteners passing through the first center column adjacent the first drive window.

16. The system of claim 1:

wherein the first pixel element further comprises a position indicator arranged on the first face of the first pixel element;

further comprising a first sensor:

coupled to the first center column proximal the first drive window; and configured to output a position signal representing an absolute position of the first pixel element relative to the first center column responsive to proximity of the position indicator; and wherein the first local controller is further configured to:
access a reference angular position of the first pixel element;
access the position signal from the first sensor; and
in response to completion of the first actuation routine:
derive a first angular position of the first pixel element based on the position signal; and
in response to a difference between the first angular position and the reference angular position exceeding a threshold difference, drive the motor to reduce the difference.

17. A system comprising:
a center column:
comprising a tube; and
defining a drive window arranged on the tube;
a bearing collar coupled to the center column adjacent in the drive window; and
a brixel unit located adjacent the drive window on the center column, and comprising:
a pixel element comprising:
a first face defining a first visual characteristic;
a second face opposite the first face and defining a second visual characteristic different from the first visual characteristic; and
rotationally coupled to the center column;
an internal ring gear coupled to the pixel element and defining an axis of rotation of the pixel element;
a motor:
arranged in the drive window; and
extending through the drive window to engage the internal ring gear; and
a local controller:
configured to access an actuation routine; and
configured to drive the motor to locate the pixel element over a sequence of angular positions, relative to the center column, defined by the actuation routine.

18. The system of claim 17:
wherein the bearing collar defines a vertical thrust surface; and
wherein the pixel element further comprises a bearing housing:
configured to carry a vertical load of the pixel element into the vertical thrust surface of the bearing collar; and
rotationally coupling the pixel element to the center column.

19. A system comprising:
a center column defining a drive window;
a bearing collar:
coupled to the center column adjacent the drive window; and
defining a vertical thrust surface; and
a brixel unit located adjacent the drive window on the center column, and comprising:
a pixel element comprising:
a first face defining a first visual characteristic; and
a second face opposite the first face and defining a second visual characteristic different from the first visual characteristic;
a bearing housing:
coupled to the pixel element;
configured to carry a vertical load of the pixel element into the vertical thrust surface of the bearing collar; and
rotationally coupling the pixel element to the center column;
a motor:
arranged in the drive window; and
extending through the drive window to rotationally couple to the bearing housing; and
a local controller:
configured to store an actuation routine in local memory; and
configured to drive the motor to locate the pixel element over a sequence of angular positions, relative to the center column, defined by the actuation routine.

20. The system of claim 19:
wherein the local controller is configured to:
access an acceleration profile and a deceleration profile from the actuation routine;
access a first rotation count from the actuation routine;
access a first direction from the actuation routine;
receive a start command issued by a primary controller; and
during a first rotation period:
in response to receiving the start command, accelerate the motor according to the acceleration profile to rotate the pixel element in the first direction;
drive the motor to rotate the pixel element over the first rotation count; and
decelerate the motor according to the deceleration profile.

* * * * *